US008182572B2

(12) United States Patent  
King et al.

(10) Patent No.: US 8,182,572 B2
(45) Date of Patent: May 22, 2012

(54) SLOW-RELEASE FERTILIZER AND METHOD OF MAKING AND USING SAME

(75) Inventors: William E. King, Cumming, GA (US);
Ronald P. Fister, Alpharetta, GA (US);
Stanley J. Norris, Cumming, GA (US)

(73) Assignee: Regal Chemical Company, Alpharetta, GA (US)

( * ) Notice: Subject to any disclaimer, the term of this patent is extended or adjusted under 35 U.S.C. 154(b) by 0 days.

(21) Appl. No.: 12/862,328

(22) Filed: Aug. 24, 2010

(65) Prior Publication Data

US 2011/0209252 A1 Aug. 25, 2011

Related U.S. Application Data

(63) Continuation of application No. 12/497,975, filed on Jul. 6, 2009, now abandoned, which is a continuation of application No. 11/506,411, filed on Aug. 17, 2006, now abandoned.

(60) Provisional application No. 60/709,378, filed on Aug. 18, 2005.

(51) Int. Cl.
C05D 9/02 (2006.01)
C05C 9/00 (2006.01)

(52) U.S. Cl. ..................................... 71/28; 71/27; 71/30

(58) Field of Classification Search .................. 71/27–63
See application file for complete search history.

(56) References Cited

U.S. PATENT DOCUMENTS

| 3,677,736 A | 7/1972 | Formaini |
| 4,089,899 A | 5/1978 | Greidinger et al. |
| 4,244,727 A | 1/1981 | Moore |
| 4,378,238 A | 3/1983 | Goertz |
| 4,554,005 A | 11/1985 | Hawkins |
| 5,039,328 A | 8/1991 | Saitoh et al. |
| 5,266,097 A | 11/1993 | Moore |
| 5,284,512 A | 2/1994 | Koskan et al. |
| 5,350,735 A | 9/1994 | Kinnersley et al. |
| 5,373,086 A | 12/1994 | Koskan et al. |
| 5,373,088 A | 12/1994 | Koskan et al. |
| 5,508,434 A | 4/1996 | Batzel et al. |
| 5,552,516 A | 9/1996 | Ross et al. |
| 5,580,840 A | 12/1996 | Harms et al. |
| 5,593,947 A | 1/1997 | Kinnersley et al. |
| 5,612,384 A | 3/1997 | Ross et al. |
| 5,635,447 A | 6/1997 | Sanders |
| 5,646,133 A | 7/1997 | Sanders |
| 5,661,103 A | 8/1997 | Harms et al. |
| 5,674,971 A | 10/1997 | Graves |
| 5,709,890 A | 1/1998 | Sanders |
| 5,783,523 A | 7/1998 | Koskan et al. |
| 5,814,582 A | 9/1998 | Koskan et al. |
| 5,854,177 A | 12/1998 | Koskan et al. |
| 5,861,356 A | 1/1999 | Koskan et al. |
| 5,935,909 A | 8/1999 | Sanders |
| 5,939,522 A | 8/1999 | Mazo et al. |
| 5,958,104 A | 9/1999 | Nonomura et al. |
| 5,998,492 A | 12/1999 | Haar, Jr. et al. |
| 6,277,302 B1 | 8/2001 | Fan et al. |
| 6,306,194 B1 | 10/2001 | Wertz et al. |
| 6,432,156 B1 | 8/2002 | O'Donnell, Sr. |
| 6,447,717 B1 | 9/2002 | Fan et al. |
| 6,464,746 B2 | 10/2002 | Neyman et al. |
| 6,660,690 B2 | 12/2003 | Asrar et al. |
| 6,884,754 B1 | 4/2005 | Schlatter et al. |
| 6,900,162 B2 | 5/2005 | Wertz et al. |
| 6,903,093 B2 | 6/2005 | Asrur et al. |
| 6,936,573 B2 | 8/2005 | Wertz et al. |
| 6,936,681 B1 | 8/2005 | Wertz et al. |
| 2002/0129544 A1* | 9/2002 | Bargiacchi et al. ............. 47/9 |
| 2005/0107259 A1 | 5/2005 | Pursell et al. |
| 2007/0039365 A1* | 2/2007 | King et al. .................... 71/28 |
| 2009/0298688 A1* | 12/2009 | King et al. ................. 504/101 |

FOREIGN PATENT DOCUMENTS

JP 2002191206 A 7/2002

OTHER PUBLICATIONS

Alford et al., "Biodegradation of Thermally Sensitized Polyaspartate," *Journal of Environmental Polymer Degradation*, 1994, vol. 2, No. 4, pp. 225-236.

* cited by examiner

*Primary Examiner* — Jerry Lorengo
*Assistant Examiner* — Jennifer Smith
(74) *Attorney, Agent, or Firm* — Johnson, Marcou & Isaacs, LLC; Robert E. Richards

(57) ABSTRACT

There is disclosed a fertilizer composition comprising a water-insoluble slow-release reacted nitrogen fertilizer and an effective amount of a water-soluble, non-aromatic poly (amino acid) of the group poly(aspartic acid), poly(glutamic acid), poly(glycine), poly(lysine) a copolymer of cystein and glutamic acid and a terpolymer of cystein and glutamic acid and aspartic acid, wherein the poly(amino acid) has a molecular size larger than that which can be absorbed by a plant. A method of making and using the fertilizer composition is also disclosed.

8 Claims, No Drawings

SLOW-RELEASE FERTILIZER AND METHOD OF MAKING AND USING SAME

CROSS-REFERENCE TO RELATED APPLICATIONS

This application is a continuation of U.S. patent application Ser. No. 12/497,975, filed Jul. 6, 2009, now abandoned which is a continuation of U.S. patent application Ser. No. 11/506,411, filed Aug. 17, 2006, now abandoned, which claims the benefit of provisional application Ser. No. 60/709,378, filed Aug. 18, 2005, all of which are incorporated herein by reference in their entirety.

FIELD OF THE INVENTION

The present invention relates to slow-release nitrogen fertilizers. Specifically, the present invention relates to a fertilizer composition that releases nitrogen slowly for a full growing season and/or improves plant, crop and turf growth relative to slow-release nitrogen fertilizers of the prior art.

BACKGROUND OF THE INVENTION

Through the years, a variety of techniques have been developed for delivering nutrients to growing plants and for extending or delaying the release of nutrients from a fertilizer.

Fertilizer is often applied as a formulated (N—P—K) solid, granule or powder, or sometimes as a liquid, to an area to be fertilized. There are basically two types of fertilizers, water-soluble fertilizers and "slow-release" fertilizers. While water-soluble fertilizers are generally less expensive than slow-release fertilizers, they have the disadvantage of leaching nutrients very quickly into and through the soil. Some solid, water-soluble fertilizers can be converted into slow-release fertilizers by employing various coatings. Alternatively, a reduction in nitrogen availability also can be obtained by using enzyme inhibitors. Slow-release fertilizers are designed to release nutrients to plants or soil over an extended period of time, which is more efficient than multiple applications of water-soluble fertilizers. Therefore, slow-release fertilizers (also referred to as controlled release or extended release) minimize the frequency with which plants must be fertilized, as well as reduce or minimize leaching.

Urea-formaldehyde (UF) condensation products are widely used as slow-release nitrogen fertilizers for crops, ornamental plants and grasses. Urea-formaldehyde fertilizer materials also can be supplied either as liquids or as solids and are the reaction products of urea and formaldehyde. Such materials generally contain at least 28% nitrogen, largely in a water-insoluble, slowly available form.

Extended release UF fertilizers (ureaform) can be prepared by reacting urea and formaldehyde at an elevated temperature in an alkaline solution to produce methylol ureas. The methylol ureas then are acidified to polymerize the methylol ureas to methylene ureas, which increase in chain length as the reaction is allowed to continue. These methylene urea polymers normally have limited water solubility, and, thus, release nitrogen throughout an extended period. Such UF fertilizers usually include a mixture of methylene urea polymers generally have a range of molecular weights and are understood to be degraded slowly by microbial action into water-soluble nitrogen. UF fertilizers are usually categorized by the amount and the release characteristics of their water insoluble nitrogen.

U.S. Pat. No. 4,089,899 (the disclosure of which is incorporated herein by reference) describes a solid, controlled release nitrogen fertilizer of the ureaform type, which consists essentially of only two nitrogen fractions: water-soluble nitrogen and cold water insoluble nitrogen.

U.S. Pat. No. 3,677,736 (the disclosure of which is incorporated herein by reference) describes a urea-formaldehyde fertilizer suspension. Other disclosures of urea-formaldehyde fertilizer compositions, both liquid and solid forms, include U.S. Pat. Nos. 4,378,238; 4,554,005; 5,039,328; 5,266,097; 5,674,971; 6,432,156; 6,464,746; 6,900,162; 6,936,573 and 6,936,681, the disclosure of which are all incorporated herein by reference.

Granular nitrogen-containing fertilizers have been produced commercially by a variety of techniques using water-soluble nitrogen products, such as urea, potassium nitrate, and ammonium phosphate. The practical advantages of handling, blending, and storing such fertilizer granules are known and well documented. The preparation of granular fertilizers using slow-release UF fertilizers also has been described in the prior art.

Recently, it has been proposed to use poly(aspartic acid) to enhance plant nutrient uptake. See U.S. Pat. No. 5,593,947 (incorporated herein by reference). For example, U.S. Pat. No. 5,350,735 (incorporated herein by reference) discloses ammoniacal nitrogen, nitrate nitrogen and urea nitrogen combined with poly(aspartic acid) to form a fertilizer. However, the nitrogen disclosed in U.S. Pat. No. 5,350,735 is a water-soluble form of nitrogen. Other similar patents are U.S. Pat. Nos. 5,783,523; 5,814,582; 5,854,177; 5,861,356 and 5,935,909 (all of which are incorporated herein by reference). However, tests with water-soluble forms of nitrogen in combination with poly(aspartic acid), or hydrolyzed forms of poly (aspartic acid), have not proven to sufficiently enhance plant growth so as to make the use of this composition economically feasible.

Accordingly, there is a need for a fertilizer that releases nitrogen slowly and improves plant, crop and turf growth relative to conventional slow-release nitrogen fertilizers or relative to thermal polyaspartate alone.

SUMMARY OF THE INVENTION

The present invention satisfies the above-described needs by providing a slow-release nitrogen fertilizer composition that improves plant, crop and turf growth. The fertilizer composition of the present invention comprises a water-insoluble slow-release nitrogen fertilizer and the water-soluble poly (amino acids), and salts thereof, disclosed in U.S. Pat. No. 5,350,735 (incorporated herein by reference), in an amount sufficient to increase the period of release of nitrogen from said water-insoluble slow-release nitrogen fertilizer and/or to improve the growth of plants, crops or turf and improved the yield of crops to which it is applied. The water-insoluble slow-release fertilizer is preferably a water-insoluble reacted nitrogen fertilizer, especially methylene urea (also known as urea formaldehyde) or isobutylidene diurea.

Another embodiment of the present invention comprises a water-insoluble slow-release nitrogen fertilizer and 0.5% to 10% by weight polyaspartate based on the weight of the slow-release nitrogen fertilizer. The water-insoluble slow-release fertilizer is preferably methylene urea.

Another embodiment of the present invention comprises a method of using the composition of the present invention. The method comprises applying the composition of the present invention to soil adjacent a plant or to the soil in which a plant, crop or turf is growing.

A further embodiment of the present invention comprises a plant at least a portion of which is coated with the composition of the present invention.

Another embodiment of the present invention comprises a seed at least a portion of which is coated with the composition of the present invention.

As used herein, "plant" is intended to refer to any part of a plant (e.g., roots, foliage, shoot) as well as trees, shrubbery, flowers, and grasses. "Seed" is intended to include seeds, tubers, tuber pieces, bulbs, etc., or parts thereof from which a plant is grown. As also used herein the term "water-insoluble" shall mean that less than 0.001% by weight of the compound is soluble in water.

Accordingly, it is an object of the present invention to provide an improved slow-release nitrogen fertilizer.

Another object of the present invention is to provide a slow-release nitrogen fertilizer that improves the growth of plants and turf and improved the yield of crops.

A further object of the present invention is to provide a slow-release nitrogen fertilizer that allows only a single application per growing season.

Yet another object of the present invention is to provide a slow-release nitrogen fertilizer that results in reduced leaching of the fertilizer into ground water, streams, rivers and the like.

Another object of the present invention is to provide a slow-release nitrogen fertilizer that produces crops with improved taste and quality.

Still another object of the present invention is to provide a slow-release nitrogen fertilizer that produces crops that have better storage properties; i.e., a longer shelf life.

A further object of the present invention is to provide a slow-release nitrogen fertilizer that produces crops that are more disease free or less disease to produce better quality fruit and vegetables.

Another object of the present invention is to provide a plant or seed that grows better because at least a portion thereof is coated with the fertilizer composition of the present invention.

These and other objects, features and advantages of the present invention will become apparent upon a review of the following detailed description of the disclosed embodiments and the appended claims.

DETAILED DESCRIPTION OF THE DISCLOSED EMBODIMENTS

The present invention comprises a water-insoluble slow-release nitrogen fertilizer and the poly(amino acids), and salts thereof, disclosed in U.S. Pat. No. 5,593,947 (incorporated herein by reference). As used herein the term "water-insoluble" shall mean that less than 0.001% by weight of the compound is soluble in water. The poly(amino acids), and salts thereof, are present in the composition in an amount sufficient to extend the period of release of nitrogen from said water-insoluble slow-release nitrogen fertilizer and/or to improve the nutrient uptake by the plant, turf or crop, such that plant and turf growth is improved and crop yield is improved relative to the slow-release nitrogen fertilizers of the prior art. More importantly, the present invention unexpectedly provides one or more of improved plant and turf growth, improved crop yield, improved crop taste, improved shelf life, improved disease resistance or reduced leaching compared to the invention disclosed in U.S. Pat. No. 5,593,947.

The amount of time that the water-insoluble slow-release nitrogen fertilizer releases nitrogen is preferably the entire growing season of the turf, plant or crop with which the composition of the present invention is used. The amount of poly(amino acids), and salts thereof, used is preferably approximately 0.5% to 10% by weight based on the weight of the slow-release nitrogen fertilizer; more preferably, approximately 1% to 5% by weight based on the weight of the slow-release nitrogen fertilizer; especially, approximately 3% by weight based on the weight of the slow-release nitrogen fertilizer.

Slow-release nitrogen fertilizers are generally categorized into one of several groups based on the process by which the nutrients are released. There are three categories into which slow-release nitrogen fertilizers can be classified.

One type of slow-release nitrogen fertilizer is relatively insoluble nutrients in pelletized form. As the pellet size is increased, the time it takes for the fertilizer to breakdown by microbial action is also increased. An example of this type of slow-release fertilizer is Nitroform or Nutrilene, which are commercially available from Nu-Gro Technologies, Inc., Grand Rapids, Mich.

The second type of slow release nitrogen fertilizer is a reacted nitrogen fertilizer; i.e., the nitrogen in the fertilizer is chemically reacted with another compound to render at least a portion of the nitrogen water-insoluble. For example, urea, which is water-soluble, can be chemically modified to make methylene ureas, better known as urea-formaldehyde—a fertilizer that is typically 38 percent nitrogen, 70 percent of which is water-insoluble. This percentage is often listed on fertilizer labels as the percent W.I.N., or the percent of water-insoluble nitrogen.

Methylene ureas are comprised of polymer chains of varying length. The shortest methylene urea chains; i.e., methylene diurea (MDU), dimethylene triurea (DMTU) and trimethylene tetraurea (TMTU), are completely soluble in cold water; whereas, the longest methylene urea chains are insoluble in boiling water and most other solvents. The release of available nitrogen from methylene urea is directly correlated to chain length with the longer chains of methylene urea showing the most slow-release properties. In soil, methylene urea is degraded into soluble, plant available nitrogen forms; such as $NH_4^+$ and $NO_3^-$, by a specific microbial activity. Because microbial activity is greatly affected by soil temperature, pH, aeration, and texture, these variables can affect the rate of release of nitrogen from urea-formaldehyde. For example, there will be less fertilizer breakdown in acid soils with poor aeration—an environment unfavorable to soil microorganisms.

Another reacted nitrogen fertilizer is isobutylidene diurea (IBDU). IBDU is similar to urea-formaldehyde, but typically contains 32 percent nitrogen, 90 percent of which is water-insoluble. However, IBDU is less dependent on microbial activity to control its release of nitrogen than urea-formaldehyde. With IBDU, nitrogen is released when soil moisture is adequate. Therefore, breakdown and release of nitrogen is increased in acid soils.

The third type of slow release nitrogen fertilizer is a coated or encapsulated fertilizer. Water-soluble fertilizers can be coated or encapsulated in membranes to slow the release of nutrients. For example, one controlled-release fertilizer is composed of a semi-permeable membrane surrounding water-soluble nitrogen and other nutrients. Water passes through the membrane, eventually causing enough internal pressure to disrupt the membrane and release the enclosed nutrients. Because the thickness of the coating varies from one pellet, or prill, to another, nutrients are released at different times from separate prills. Release rates of these fertilizers are dependent on temperature, moisture, and thickness of the coating.

Another type of coated fertilizer is sulfur-coated urea (SCU), which is manufactured by coating hot urea with molten sulfur and sealing with a polyethylene oil or a microcrystalline wax. Nitrogen is released when the sealant is broken or by diffusion through pores in the coating. Thus, the rate of release is dependent on the thickness of the coating or the sealant weight. SCU is broken down by microorganisms, and chemical and mechanical action. The nitrogen in SCU is released more readily in warm temperatures and dry soils. SCU appears to be more effective when applied to the soil surface, rather than mixed into the soil.

A preferred slow-release nitrogen fertilizer is urea-formaldehyde in either granular or liquid form. Urea-formaldehyde in solid form is commercially available under the designation Nitroform or Nutrilene from Nu-Gro Technologies, Inc., Grand Rapids, Mich. Other similar urea formaldehyde products are available from other manufacturers. Slow-release nitrogen fertilizers useful in the present invention are also disclosed in U.S. Pat. Nos. 6,936,681; 6,936,573 and 6,900,162 (the disclosures of which are all incorporated herein by reference).

Generally, it is preferred that the reacted nitrogen fertilizer comprises approximately 1% to 50% by weight nitrogen. When the reacted nitrogen fertilizer is in liquid form, it is preferred that the reacted nitrogen fertilizer comprises approximately 1% to 36% by weight nitrogen. When the reacted nitrogen fertilizer is in solid form, it is preferred that the reacted nitrogen fertilizer comprises approximately 5% to 50% by weight nitrogen.

Urea-formaldehyde is also available in liquid form. A urea-formaldehyde in liquid form is commercially available from Regal Chemical Company, Alpharetta, Ga., under the designation LiquiGreen®. Liquid urea-formaldehyde useful in the present invention is also disclosed in U.S. Pat. Nos. 3,677,736 and 4,378,238 (the disclosures of which are all incorporated herein by reference).

As stated above, the poly(amino acids), and salts thereof, preferred for use in the present invention are those disclosed in U.S. Pat. No. 5,593,947. Specifically those poly(amino acids), and salts thereof, include, but are not limited to, water-soluble, non-aromatic poly(amino acids) of the group poly (aspartic acid), poly(glutamic acid), poly(glycine), poly(l-ysine) a copolymer of cystein and glutamic acid and a terpolymer of cystein and glutamic acid and aspartic acid, wherein those poly(amino acids) have at least about 15 repeating organic acid mers and a molecular size larger than 1,000 Daltons (MO; preferably, about 3,000 to 28,000 Daltons; more preferably, about 4,000 to 14,000 Daltons; especially, about 3,000 to 5,000 Daltons.

Poly(amino acids) and salts thereof more preferred for use in the present invention are non-chelating, water-soluble, non-aromatic poly(amino acids) of the group poly(aspartic acid), poly(glutamic acid), poly(glycine), poly(lysine) a copolymer of cystein and glutamic acid and a terpolymer of cystein and glutamic acid and aspartic acid, wherein the poly (amino acids) have a molecular size larger than that which can be absorbed by a plant with which it is used.

Poly(amino acids) and salts thereof especially preferred for use in the present invention are water-soluble non-aromatic polymers having a weight average molecular weight ($M_w$) larger than 1,000 and cannot be absorbed by the plant and are selected from one of the following structures:

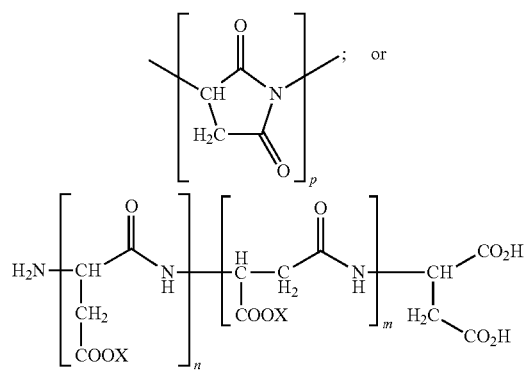

wherein, $X=H^+$, Na, $NH_4^+$, $K^+$, $Ca^{+2}$, $Mg^+$, $Zn^+$, $Co^{+2}$, $Li^+$, $Ba^{+2}$, $Fe^{+2}$ and $Fe^{+3}$, n=0-100 mole % of aspartic acid mer units linked by α-peptide bonds or α form units; m=0-100 mole % of aspartic acid mer units linked by β-peptide bonds or β form units: and p=10-1,000. Preferably, the poly(amino acids) have the foregoing structures, wherein the polyaspartic acid has m>50 mole % β form and n<50 mole % α form; preferably, wherein m is equal to 60-80 mole % β form; especially, wherein m is equal to 70-80 mole % β form and n is equal to 25-30 mole % α form. Preferably, the polyaspartic acid has a weight average molecular weight ($M_w$) of about 1,000 to 100,000.

The poly(amino acids), and salts thereof, most preferred for use in the present invention is polyaspartate, particularly sodium polyaspartate. Polyaspartate is a biopolymer synthesized from L-aspartic acid. Aspartic acid is widely used in the food and pharmaceutical industries as an important amino acid. Aspartic acid is alanine with one of the β-hydrogens replaced by a carboxylic acid group. Polyaspartate useful in the present invention has a weight average molecular weight ($M_w$) of approximately 1,000 to approximately 20,000; preferably, approximately 1,500 to approximately 10,000; especially, approximately 8,000. A particular useful form of polyaspartate for use in the present invention is thermal polyaspartate. Thermal polyaspartate (T-PA) useful in the present invention is commercially available from Nanochem Inc., 6502 South Archer Road, Bedford Park, Ill. 60501 under the designation Amisorb™ and Magnet™.

A scheme for the synthesis of T-PA is shown below as Scheme 1.

Scheme 1 -- Synthesis of Thermal Polyaspartate

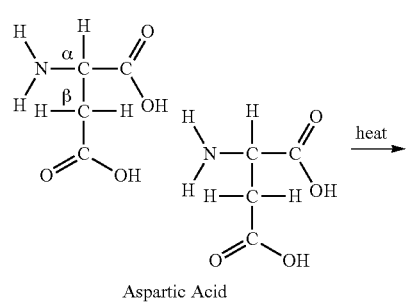

Aspartic Acid

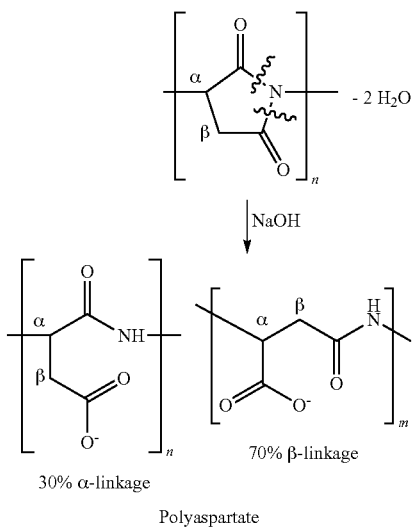

30% α-linkage 70% β-linkage

Polyaspartate

The fertilizer of the present invention can also include other additives, such as other plant nutrients, amino acids, pesticides; i.e., insecticides, herbicides, fungicides and plant growth regulators. These additives are included in the fertilizer composition of the present invention in amounts sufficient to be effective for the purpose for which they are intended. Such amounts preferably will generally range from approximately 1 to 10 percent by weight based on the slow-release nitrogen fertilizer.

Insecticides that can be used in the present invention preferably include, but are not limited to, those insecticides disclosed in U.S. Pat. Nos. 5,709,890 and 5,646,133, the disclosures of which are incorporated herein by reference. Useful amounts are also disclosed in those patents. Such compositions can also be used in the manner disclosed in U.S. Pat. Nos. 5,709,890 and 5,646,133.

Herbicides that can be used in the present invention preferably include, but are not limited to, those herbicides disclosed in U.S. Pat. No. 5,635,447, the disclosure of which is incorporated herein by reference. Useful amounts are also disclosed in that patent. Such compositions can also be used in the manner disclosed in U.S. Pat. No. 5,635,447.

Fungicides that can be used in the present invention preferably include, but are not limited to, chlorothlonil, propiconazole, thiophenate-methyl, azoxystrobin, benzoic acid, dithianon, fenhexamid, fenpropidin, fluazinam, fludioxonil, flutolanil, fosetyl-aluminum, hymexazol, imazalil, iprodione, mancozeb, penconazole, picoxystrobin, prochloraz, propamocarb hydrochloride, pyrimethanil, thiram, tolclofos-methyl, tolylfluanid, triadimefon, triforine. Useful amount of fungicides that preferably can be used in the present invention are 0.25 to 10 percent by weight based on the slow-release nitrogen fertilizer.

Amino acids that can be used in the present invention preferably include, but are not limited to, aspartic acid, glutamic acid, alanine, arginine, cystine, glycine, histidine, isoleucine, lysine, methionine, praline, phenylalanine, serine, threonine, trytophan, tyrosine and valine. Useful amount of amino acids that preferably can be used in the present invention are 1 to 10 percent by weight based on the slow-release nitrogen fertilizer.

Other plant nutrients that can be used in the present invention preferably include, but are not limited to, fluvic acids, potassium sulfate, iron sulfate, diammonium phosphate, potassium chloride, or potassium thiosulfate. Useful amounts of other plant nutrients that preferably can be used in the present invention are 0.5 to 20 percent by weight based on the slow-release nitrogen fertilizer.

The fertilizer composition of the present invention can be applied using any conventional fertilizer allocation technique. Such techniques include, but are not limited to, broadcast, row placement, sub-surface placement, strip-till, pre-plant, sideband, root zone banding, on-the-go variable rate, or on-the-fly. Generally, the composition of the present invention is applied to the soil in which plants, crops or turf is growing at the rate of approximately 1 to 100 gallons per acre or approximately 3 to 300 pounds per acre per application. For agricultural applications (crops), the composition is preferably applied at a rate of approximately 15 to 100 gallons per acre or approximately 45 to 300 pounds per acre per application. For turf applications, the composition is preferably applied at a rate of approximately 2 to 30 gallons per acre or approximately 6 to 90 pounds (units nitrogen) per acre per application. For ornamental plant applications, the composition is preferably applied at a rate of approximately 1 to 10 ounces per plant or approximately 10 to 300 ounces per 1000 square feet.

It is specifically contemplated that the for on-the-fly-type applications, the water-insoluble slow-release nitrogen fertilizer is applied to said soil at the rate of approximately 10 to 400 pounds per acre per application and the water-soluble; non-aromatic polymer is applied to said soil at a rate of approximately 2.7 to 128 ounces per acre per application.

It is also specifically contemplated that the fertilizer composition of the present invention can be applied to all or a portion of a plant or seed. For example, the roots of a plant can be dipped into a quantity of the liquid fertilizer composition of the present invention prior to planting. Similarly, the liquid fertilizer composition of the present invention can be sprayed onto, or otherwise blended with, seed prior to planting.

The following examples are intended to illustrate the present invention, but are not intended to limit the scope of the present invention in any manner.

EXAMPLE 1

A liquid slow-release nitrogen fertilizer in accordance with the present invention is prepared as follows.

50 gallons of LiquiGreen® are added to a mixing tank. LiquiGreen® is a liquid urea formaldehyde fertilize that contains up to 32 percent nitrogen, up to 80 percent of which is water-insoluble, which is commercially available from Regal Chemical Company, Inc., Alpharetta, Ga. To the LiquiGreen® is added 6 quarts of sodium polyaspartate having a weight average molecular weight of 1,000 to 10,000. The desired mixture of various molecular weights is then blended at ambient temperature with a paddle blender, bypass agitation or an air system. The resulting blend is useful as a liquid slow-release reacted nitrogen fertilizer.

EXAMPLE 2

A solid slow-release nitrogen fertilizer in accordance with the present invention is prepared as follows.

100 pounds of solid urea formaldehyde are added to the hopper of a tumbling blender. 2-4 quarts of poly(amino acids) or salts thereof, such as, sodium polyaspartate are also added to the blender. The sodium polyaspartate is of one or more molecular weights of up to 10,000. The mixture is blended until the sodium polyaspartate is evenly distributed on the urea formaldehyde granules. The resulting blend is useful as a solid slow-release reacted nitrogen fertilizer.

EXAMPLE 3

A trial was conducted in a production field of "Savannah" mustard greens. The field was split using a standard nitrogen program of two applications of ammonium nitrate and a single pre-emergent application of Anchor™. Anchor™ is a mixture of 30% by weight liquid urea formaldehyde (66%-70% nitrogen of which 60%-70% by weight is water-insoluble) and 3% by weight sodium polyaspartate. All other fertilization was preformed in the same manner across the entire field. Tillage, planting and maintenance were done in accordance with normal production practices. Data was taken by harvesting paired samples from both the Anchor™ and the ammonium nitrate treated areas. The line between the two treatments was identified in the field. Samples were taken a few rows into the plots in order to avoid cross-contamination, but close enough that the paired samples were subjected to similar growing conditions. Applications were made using large-scale production equipment.

The treatments included in this trial is shown in Table 1 below:

TABLE 1

| Treatment | Timing | Rate per Acre |
| --- | --- | --- |
| Ammonium nitrate | Preemergent | 80 lbs nitrogen |
| Ammonium nitrate | 21 days later | 40 lbs nitrogen |
| Anchor ™ | Preemergent | 32 gals. (96 lbs nitrogen) |

On average, the sample from the Anchor™ plots yielded 3,267 lbs of mustard greens per acre more than the ammonium nitrate treated samples (19,602 lbs/acre vs. 16.335 lbs/acre). This equates to an approximately 20% increase in yield over the standard fertilization program.

EXAMPLE 4

The following yield data compares the composition of the present invention against standard industry treatments practice for mustard greens, watermelons, cantaloupes and tomatoes. The composition described below as Anchor™ is a mixture of 30% by weight liquid urea formaldehyde (70% nitrogen of which 60%-70% by weight is water-insoluble) and 3% by weight sodium polyaspartate.

Mustard Greens:

| Treatments | Rate of Actual Nitrogen/acre | Total yields Per Acre |
| --- | --- | --- |
| Ammonium Nitrate plus Diammonium Phosphate (DAP) | 120 lbs. (units) | 16,335 lbs |
| Anchor ™ | 100 lbs. (units) | 19,602 lbs |

The crops treated with Anchor™ had an increase in yield of 20% over the yield for crops receiving the standard fertilizer treatment. The crops treated with Anchor™ also had healthier leaves that were thicker and fuller and had better stems than the crops receiving the standard fertilizer treatment.

Watermelons:

| Treatments | Rate of Actual Nitrogen/acre | Total yields Per Acre |
| --- | --- | --- |
| Ammonium Nitrate | 90 lbs (units) | 66,120 lbs. |
| Anchor ™ | 100 lbs (units) | 102,602 lbs |

The crops treated with Anchor™ had an increase in yield of 54% over the yield for crops receiving the standard fertilizer treatment. The crops treated with Anchor™ also produced more fruit and the average piece of fruit weighed more than the melons treated with the standard fertilizer treatment. The melons treated with Anchor™ were more dense and had a higher sugar content than the melons treated with the standard fertilizer treatment.

Cantaloupe:

| Treatments | Rate of Actual Nitrogen/acre | Total yields Per Acre | Numbers of Melons/Acre |
| --- | --- | --- | --- |
| Calcium Nitrate and Ammonical Nitrogen | 110 lbs (units) | 36,590 lbs. | 8,412 melons |
| Anchor ™ | 105 lbs (units) | 54,520 lbs | 10,548 melons |

The crops treated with Anchor™ had an increase of 22% in the number of melons per acre over the yield for crops receiving the standard fertilizer treatment, while the total weight of the Anchor™ treated crops increased 49% per acre over the yield for crops receiving the standard fertilizer treatment. Yields were more fruit and improved weight per acre. The Anchor™ treated also fruit had greater sugar content and darker color than the fruit treated with the standard fertilizer treatment.

Tomatoes:

| Treatments | Rate of Actual Nitrogen/acre | Total yields Per Acre |
| --- | --- | --- |
| Urea ammonium nitrate 28-0-0 Nitrogen | 280 lbs (units) | 27,300 lbs. |
| Anchor ™ | 280 lbs (units) | 38,493 lbs |

Standard practice received nitrogen through a drip irrigation system on a weekly basis. Anchor™ was applied once after planting. Anchor™ treated tomatoes were more firm and had greater fruit development per cluster. The Anchor™ treated tomatoes had an increased of 41% in total yield over the yield for crops receiving the standard fertilizer treatment.

EXAMPLE 5

Anchor™ in a liquid form is mixed with 20%-50% by weight water to be used as a dip treatment for nursery liners, vegetable or flowering plants, prior to planting or transplanting or to bulbs prior to planting. It is believed that the safety to the crop is due to the nutrients being held tightly to the Anchor™ product. Improved plant growth results from treating the plant roots with this composition.

Similar techniques for treating roots of plants with pesticides and/or fertilizers by dipping or spraying are well known in the art and can be used with the present invention and are disclosed in U.S. Pat. Nos. 6,936,573; 5,958,104; 5,661,103 and 5,935,909, the disclosures of which are incorporated herein by reference.

EXAMPLE 6

The Anchor™ formulation in a liquid form is injected into a seed coating blender at the rate of 1%-5% by weight of the seed weight. The Anchor™ formulation also can be blended with fungicide, insecticide or other pesticide coatings at the same time. Then, the coated seed is allowed to dry thoroughly prior to packaging. When the coated seeds are planted, improved seed growth results.

Similar techniques for coating seed with pesticides and/or fertilizers are well known in the art and can be used with the present invention and are disclosed in U.S. Pat. Nos. 6,903,093; 6,660,690; and 6,884,754, the disclosures of which are incorporated herein by reference.

It is specifically contemplated that the slow-release nitrogen fertilizer of the present invention can be applied once per growing season. However, multiple applications can also be used, if desired.

Provisional application Ser. No. 60/709,378 filed Aug. 18, 2005 is incorporated herein by reference.

It should be understood, of course, that the foregoing relates only to certain disclosed embodiments of the present invention and that numerous modifications or alterations may be made therein without departing from the spirit and scope of the invention as set forth in the appended claims.

What is claimed is:

1. A method of treating plants growing in soil consisting essentially of:
    applying to at least a portion of said soil approximately 10 to 400 pounds per acre of urea-formaldehyde; and
    applying to said same portion of said soil approximately 2.7 to 128 ounces per acre polyaspartate.

2. The method of claim 1, wherein said polyaspartate has a weight average molecular weight of approximately 1,000 to 20,000.

3. The method of claim 1, wherein said urea-formaldehyde has a nitrogen content of approximately 1% to 50% by weight.

4. A method of applying fertilizer to soil consisting essentially of:
    applying to said soil a fertilizing amount of urea formaldehyde; and
    applying to said soil approximately 0.5% to 10% by weight polyaspartate based on said urea formaldehyde.

5. A method comprising applying to at least a portion of a seed a composition consisting essentially of:
    urea formaldehyde; and
    approximately 0.5% to 10% by weight polyaspartate based on said urea formaldehyde.

6. A method comprising applying to at least a portion of a plant a composition consisting essentially of:
    urea formaldehyde; and
    approximately 0.5% to 10% by weight polyaspartate based on said urea formaldehyde.

7. The method of claim 6, wherein the composition is applied to the plant by dipping or spraying.

8. A method of increasing the yield of crops comprising:
    providing to said crops a crop-increasing amount of a composition consisting essentially of:
    urea formaldehyde; and
    approximately 0.5% to 10% by weight polyaspartate based on said urea formaldehyde.

* * * * *